(12) United States Patent
Matsco et al.

(10) Patent No.: US 6,309,755 B1
(45) Date of Patent: Oct. 30, 2001

(54) PROCESS AND PANEL FOR PROVIDING FIXED GLAZING FOR AN AUTOMOTIVE VEHICLE

(75) Inventors: Mark M. Matsco, South Lyon; Eric F. J. M. van der Meulen, Wixom; Ralf Dujardin, Novi, all of MI (US)

(73) Assignee: Exatec, LLC., Wixom, MI (US)

( * ) Notice: Subject to any disclaimer, the term of this patent is extended or adjusted under 35 U.S.C. 154(b) by 0 days.

(21) Appl. No.: 09/499,433

(22) Filed: Feb. 7, 2000

Related U.S. Application Data

(60) Provisional application No. 60/140,225, filed on Jun. 22, 1999.

(51) Int. Cl.$^7$ ................................................ B32B 13/12
(52) U.S. Cl. ..................... 428/451; 428/412; 428/426; 156/100; 156/106; 427/163; 427/164; 427/165
(58) Field of Search .................................. 428/41.2, 412, 428/426, 451; 156/100, 106; 427/163, 164, 165

(56) References Cited

U.S. PATENT DOCUMENTS

| | | | | |
|---|---|---|---|---|
| 4,138,284 | * | 2/1979 | Postupack | 156/100 |
| 6,000,814 | * | 12/1999 | Nestell et al. | 362/267 |
| 6,143,387 | * | 11/2000 | Kubler et al. | 428/41.7 |

* cited by examiner

*Primary Examiner*—Cathy Lam
(74) *Attorney, Agent, or Firm*—John R. Benefiel

(57) ABSTRACT

A process and panel for fixed automotive glazing, the panel molded from polycarbonate, a UV radiation blocking hard coat deposited thereon, and a pigmented primer applied in a defined band extending about the perimeter. The hard coat protects the pigmented primer coating so that two separate coatings are not required.

7 Claims, 1 Drawing Sheet

PROCESS AND PANEL FOR PROVIDING FIXED GLAZING FOR AN AUTOMOTIVE VEHICLE

CROSS REFERENCE TO RELATED APPLICATIONS

This application claims the benefit of the filing date of provisional application No. 60/140,225, filed on Jun. 22, 1999.

BACKGROUND OF THE INVENTION

This invention concerns automotive glazing and more particularly glazing panels of a molded synthetic resin, such as polycarbonate. Conventional glass panels have been used for automotive glazing applications for many years.

In one type of automotive window construction currently in common use, fixed glazing panels have been installed using an adhesive bonding of the perimeter of the panels to a body structure defining a window opening.

This construction requires masking of the perimeter to conceal the bonded joint for aesthetic purposes, and to prevent degrading of the adhesive by exposure to the ultraviolet radiation present in sunlight. An effective masking which is in widespread use is a black-out bond applied about the perimeter of the inside surface of the glazing panel. This black-out band must be accurately applied in order to be aligned with the bonded glazing joint to properly mask the same. In the case of glass glazing, a baked-on finish has typically been utilized to produce a black border, since the glass panel is usually formed after being heated in an oven, and the heating required for forming can be advantageously used to achieve curing of the black-out ink.

The use of an adhesive joint also requires priming of the glazing surface to achieve proper bonding of the adhesive to the surface of the glazing panel.

Thus, multiple coatings are required to be applied about the perimeter of the glazing panel in order to practice this type of automotive window construction.

It has long been proposed to mold automotive glazing panels from a synthetic resin, such as polycarbonate, in order to reduce vehicle weight, improve occupant protection, and to allow greater body styling flexibility, due to the ease of producing markedly curved panels.

Such molded panels are contemplated as being especially adapted for use in fixed glazing installations where a black-out border is necessary.

It is the object of the present invention to provide a simplified process and panel for creating a masked bonded joint for fixed automotive glazing panels of molded synthetic resin of the type described above.

SUMMARY OF THE INVENTION

The above recited object and others which will be understood upon a reading of the following specification and claims are achieved by the step of applying an adhesive primer coating to an inside perimeter surface of a polycarbonate panel, the primer also containing a black-out pigmentation. The pigmented primer is applied in a band extending about the panel perimeter in a defined pattern so as to produce an aesthetically suitable masking border on the inside surface of the panel.

The molded polycarbonate panel is hard coated prior to applying the pigmented primer to the panel inside surface to improve abrasion resistance. The hard coat also has a UV blocking function which serves to protect the pigmented primer coating from degradation by exposure to the UV radiation present in sunlight.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
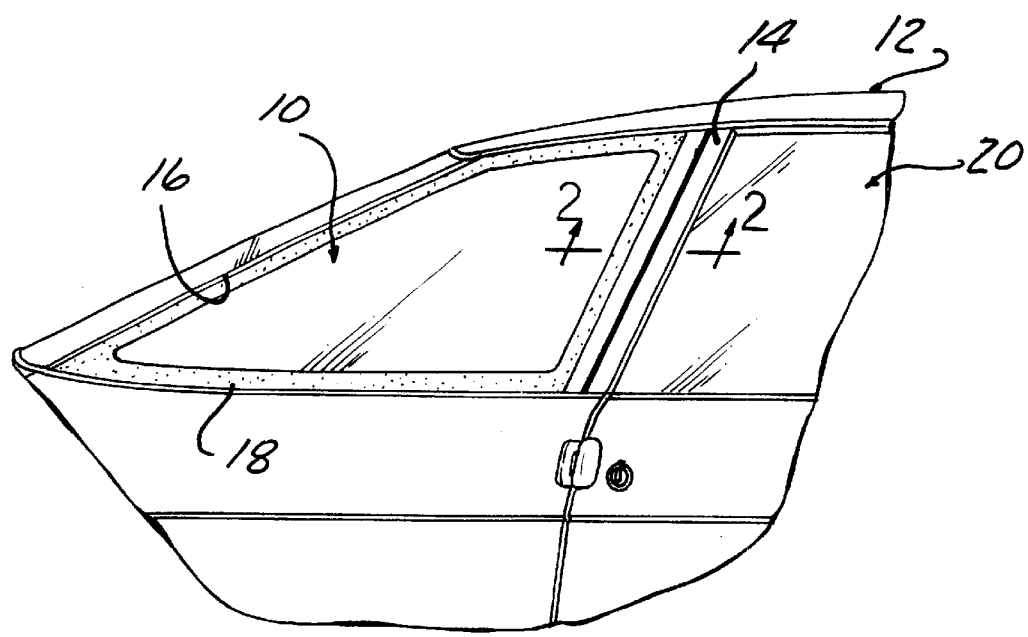
FIG. 1 is a fragmentary side view of an automotive vehicle incorporating a fixed glazing panel having masking a black-out border treatment.

Referring to FIG. 1, the present invention concerns a fixed glazing panel 10, here shown as the rear side light of an automotive vehicle 12, disposed to the rear of a side door 20 and the "B" pillar 14 of the body structure.

The panel 10 is fixedly mounted in a body structure opening 14 in conventional fashion.

A black-out border 18 is provided, extending about the entire perimeter of the inner surface of the panel 10 in the well known manner.

This black-out border comprises an opaque band concealing the Joint between the body structure and the glazing panel 10, to provide an attractive appearance at a relatively low cost.

Figure 2A:
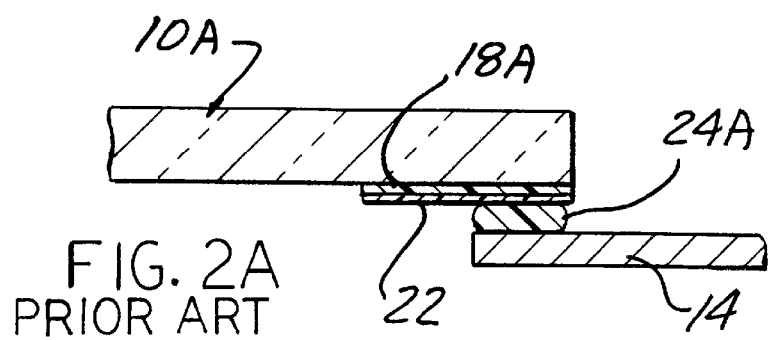
FIG. 2A is a fragmentary sectional view taken through a prior art bonded joint of a fixed glazing panel with coating portions exaggerated for clarity.

In a prior art glass panel installation, shown in simplified form in FIG. 2A omitting moldings and details of the body structure, the border 18A is a baked on finish, cured when the panel 10A is heated for shaping of the panel 10A. The border 18A performs an additional function in this environment, i.e., it acts to block UV radiation, protecting a primer coating 22 and adhesive bead (or elastomeric seal) 24A from degradation which would otherwise occur upon exposure to the UV radiation in sunlight.

Figure 2B:
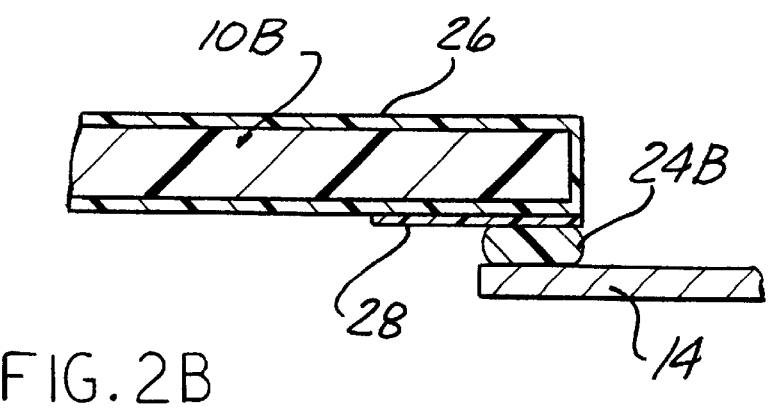
FIG. 2B is a fragmentary sectional view taken through a fixed glazing panel bonded joint, as produced by a process according to the present invention, with the thickness of the coatings exaggerated for clarity.

FIG. 2B shows a glazing panel 10B according to the present invention, molded from a synthetic resin, here contemplated as being an injection molded polycarbonate.

The entire glazing panel 10B is treated to deposit a hard coat 26 over the entire surface of the panel 10B. This hard coating is of a known type and may comprise several coating layers, including one or more dip coatings.

Such dip coatings improve the abrasion resistance of the molded polycarbonate to some extent, but the scratch resistance of the dip coated panel 10B is still insufficient for automotive use. Polycarbonate panels are not themselves sufficiently resistant to weathering to be suitable for automotive glazing, since that material is subject to yellowing when exposed to sunlight even for relatively short periods. This characteristic requires that the dip coatings also provide UV blocking to improve weatherability of the polycarbonate panel. See U.S. Pat. No. 4,842,941 for a description of suitable dip coatings.

To provide adequate abrasion resistance for automotive application, an additional process has heretofore been developed involving a plasma enhanced chemical vapor deposition (PECVD), often simply referred to as a plasma coating. In the PECVD process, reactants such as organosilicone are activated by a plasma to form a coating on panels disposed in a vacuum chamber into which the activated reactants are introduced.

Such plasma coatings are applied over the previously applied dip coatings described above.

Reference is made to U.S. Pat. Nos. 5,298.587; 5,320,875; 5,433,786; 5,494,712; 5,718,967 and 5,900,284, which set forth further details of plasma coating) processes and apparatus which are hereby incorporated by reference.

An improved process and apparatus for production of plasma coated panels is described in copending application U.S. Ser. No. 09621,203, filed on Jul. 21, 2000.

The hard coat 26 also functions to block UV to protect the panel 10B, which together with the dip coatings will also protect the adhesive bead or seal 24B from the effects of sunlight.

The present invention takes advantage of the UV blocking coatings in providing only a single coating 28 on the inner surface extending in a band about the perimeter of the panel 10B, which coating functions both as a primer for the adhesive and as a black-out border. The coating 28 is itself protected from UV radiation by the hard coat 26.

A suitable black-out primer for this use is BETASEAL (trademark) which, while sold as a glass primer, will create a secure bond between the hard coat 26, and polyurethane adhesives, seals, etc.

BETASEAL (trademark) is available from Essex Specialty Products, Inc., under product code 15969, that company having a place of business at 1250 Harmon Road, Auburn Hills, Mich. 48326.

The BETASEAL material is a liquid including toluene (5–15%), methyl ethyl ketone (40–50%), n-butyl acetate (<10%) having a suspended pigment comprised of carbon black (5–15% by weight), having sufficiently low viscosity such as to be able to be sprayed on to the panel 10B for coating the panel perimeter as described.

The pigmented primer coating 28 must be applied in a band accurately located with respect to the panel edge so as to ensure that the coating 28 thereby suitably masks the bonded joint. In addition, a neat edge should be maintained as the black-out border is prominently visible and thus comprises an aesthetic feature. A frosting treatment can be used on the opposite panel surface to lessen the need for a neat edge.

Suitable application techniques for the combined primer and black-out material include first masking the regions of the panel adjacent the perimeter of the panel, as by use of a well known hinged masking screen, and then spray coating the unmasked border with the material to form a black band extending around the panel inside surface.

Other suitable techniques could be utilized adapted to the particular flow characteristics of the primer-blackout material, such as ink jet printing, screen printing, flow coating, etc.

The resulting band border has been found to successfully perform the functions as described.

Handling of the panels 10B during these steps is facilitated by molding in one or more tabs, as described in detail in copending U.S. patent application Ser. No. 09/227,888, filed on Mar. 29, 1999, now U.S. Pat. No. 6,183,678, issued on Feb. 6, 2001. The tab or tabs are trimmed off after the panel process is completed, as described in that application.

The black-out border can take various forms in addition to a simple band, including a fade-out, or combined with additional treatments such frosting as described above, as long as it produces a defined aesthetic feature which effectively masks the adhesive joint.

What is claimed is:

1. A panel for use as a fixed glazing adhesively bonded about its perimeter to a body structure defining a window opening in an automotive vehicle, comprising a panel of clear molded polycarbonate;

said panel having a UV radiation blocking hard coat deposited onto entire surface;

a pigmented adhesive bond primer material applied over said hard coat in a band extending about a perimeter of said panel, said pigmentation producing an opaque black out of said band so that said primer material provides an adhesive joint masking band extending about said perimeter as well as being a bonding primer for strengthening said adhesive joint.

2. A panel for use as a fixed glazing adhesively bonded about its perimeter to a body structure defining a window opening in an automotive vehicle, comprising a panel of clear molded polycarbonate;

a panel having a UV radiation blocking hard coat deposited onto entire surface;

a pigmented adhesive bond primer material applied over said hard coat in a band extending about a perimeter of said panel, wherein said pigmented primer comprises a hydrocarbon ketone liquid with a carbon black pigment suspension.

3. A process for manufacturing a fixed automotive glazing panel adapted to be mounted in an opening in an automotive body structure by use of an adhesive bonded joint, comprising the steps of:

molding a glazing panel from a synthetic resin;

depositing a UV radiation-blocking hard coat onto the entire surface of said molded panel;

applying a pigmented primer coating material onto the perimeter of an inside surface of said hard coated molded panel which is capable of bonding to the hard coat and to an adhesive sealant for mounting said glazing panel to said body structure, and provides a masking of the bonded joint between said glazing panel and said body structure.

4. The process according to claim 3 wherein said glazing panel is molded from polycarbonate.

5. The process according to claim 3 wherein said application step includes the step of producing a defined border pattern extending about said perimeter of said hard coated panel.

6. The process according to claim 5 wherein said application step comprises the step of masking said panel in regions adjacent said panel perimeter, and spraying said pigmented primer coating material onto said panel perimeter.

7. A process according to claim 3 wherein said pigmented primer coating material comprises a hydrocarbon ketone liquid with a carbon black pigment suspension.

\* \* \* \* \*